US012587252B2

(12) United States Patent
Bi et al.

(10) Patent No.: US 12,587,252 B2
(45) Date of Patent: Mar. 24, 2026

(54) METHOD, APPARATUS, AND SYSTEM FOR ENVIRONMENT AWARE MIMO FOR HIGH FREQUENCY

(71) Applicant: Huawei Technologies Co., Ltd., Shenzhen (CN)

(72) Inventors: Xiaoyan Bi, Ottawa (CA); Jianglei Ma, Ottawa (CA); Wen Tong, Ottawa (CA); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/650,632

(22) Filed: Apr. 30, 2024

(65) Prior Publication Data

US 2024/0283513 A1 Aug. 22, 2024

Related U.S. Application Data

(63) Continuation of application No. PCT/CN2021/128523, filed on Nov. 3, 2021.

(51) Int. Cl.
*H04L 5/12* (2006.01)
*H04B 7/06* (2006.01)
*H04B 17/391* (2015.01)

(52) U.S. Cl.
CPC ........... *H04B 7/0626* (2013.01); *H04B 7/063* (2013.01); *H04B 17/3911* (2015.01)

(58) Field of Classification Search
CPC .. H04B 7/0626; H04B 7/063; H04B 17/3911; H04B 7/0617; H04L 5/0048; G01S 5/08; G01S 5/0273; G01S 5/0036; G01S 5/0236

(Continued)

(56) References Cited

U.S. PATENT DOCUMENTS

| | | | |
|---|---|---|---|
| 11,310,816 B2 | 4/2022 | Manolakos et al. | |
| 11,317,414 B2 | 4/2022 | Sadiq et al. | |

(Continued)

FOREIGN PATENT DOCUMENTS

| | | |
|---|---|---|
| CN | 112237034 A | 1/2021 |
| CN | 112369087 A | 2/2021 |
| WO | 2020028517 A1 | 2/2020 |

OTHER PUBLICATIONS

Huawei et al., "Details of NR positioning techniques," 3GPP TSG RAN WG1 Meeting #94bis, R1-1810152, Oct. 8-12, 2018, pp. 11.

*Primary Examiner* — Helene E Tayong
(74) *Attorney, Agent, or Firm* — Slater Matsil, LLP

(57) ABSTRACT

Aspects of the present disclosure enable the determination of beamforming information and channel information for communication between a transmitter and receiver by using a propagation path map. The propagation path map may provide an association between a location of the receiver and channel characteristics between the transmitter and the receiver via a direct propagation path and possible reflection propagation paths. The propagation path map may be used to obtain a more accurate location of the receiver, AoA at the transmitter and/or receiver, AoD at the transmitter, and/or receiver and other sensing information for beamforming and improving the RF propagation map. The association between a location of the receiver and channel characteristics between the transmitter and the receiver may then aid in performing beam measurements and/or channel measurements.

32 Claims, 11 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2017/0280346 A1* | 9/2017 | Baligh | ................. H04W 24/10 |
| 2019/0097712 A1 | 3/2019 | Singh et al. | |
| 2020/0037301 A1 | 1/2020 | Park | |
| 2021/0083737 A1 | 3/2021 | Capdevielle et al. | |
| 2022/0278796 A1* | 9/2022 | Huang | ................. H04B 7/0619 |

* cited by examiner

METHOD, APPARATUS, AND SYSTEM FOR ENVIRONMENT AWARE MIMO FOR HIGH FREQUENCY

CROSS-REFERENCE TO RELATED APPLICATIONS

This application is a continuation of International Application No. PCT/CN2021/128523, filed on Nov. 3, 2021, the disclosure of which is hereby incorporated by reference in its entirety.

TECHNICAL FIELD

The present disclosure relates generally to wireless communications, and in particular embodiments, to methods and devices for high frequency environment aware multiple input multiple output (MIMO).

BACKGROUND

In some wireless communication systems, user equipments (UEs) wirelessly communicate with a base station (BS) to send data to the base station and/or receive data from the base station. A wireless communication from a UE to a BS is referred to as an uplink (UL) communication. A wireless communication from a base station to a UE is referred to as a downlink (DL) communication.

Resources are required to perform uplink and downlink communications in such wireless communication systems. For example, a BS may wirelessly transmit data, such as a transport block (TB), using wireless signals and/or physical layer channels, to a UE in a downlink transmission at a particular frequency and over a particular duration of time. The frequency and time duration used are examples of resources.

In some wireless communication systems, beamforming is used in which a communication signal is transmitted in a particular direction instead of being transmitted omni-directionally. High frequency communication, one example of which is subTHz communication, is a technology that may improve the performance of future cellular networks due to a large bandwidth for communication. However, the higher the frequency involved the smaller the antenna sizes involved. Therefore, more antennas may be needed in multiple-input multiple-output (MIMO) systems to facilitate the high frequency communication (e.g. by satisfying a certain signal to noise ratio (SNR) threshold at the receiver).

Beam acquisition may become challenging due to a large searching space (i.e. a large number of possible directions where a receiver could be located) for narrow beams that may result in a longer duration of time to acquire a preferred beam to be used for communication between a transmitter and receiver. It would be advantageous to be able to perform channel acquisition in high frequency communication systems with a minimum of signaling between network devices to reduce overhead and latency in the channel acquisition method.

SUMMARY

Beams that are used for communication at higher frequencies may be narrow to focus the signal power on specific direction. Hence, a narrow beam at high frequency can be defined as a beam with a width that is sufficient to facilitate high frequency communication given the channel conditions like: path-loss, the distance and environment between the transmitter and the receiver. With narrow beams, the beam management and beam acquisition becomes more complicated. Note that at different frequency ranges, the beam widths (that facilitate the communication) are different due to different path-loss and antenna sizes, i.e., a narrow beam at low frequency is wide compared to that at high frequency.

According to a first aspect, there is provided a method of channel information acquisition for a telecommunication system including a base station serving a user equipment (UE) in a geographical area, the method involving: transmitting, by the base station, to the UE, configuration information including an association of a location of the UE and channel information pertaining to a channel between the base station and the UE, wherein at least a portion of the geographical area is partitioned into a first grid including a plurality of first grid elements; transmitting, by the base station, reference signals in the direction of the location of the UE on one or more propagation paths, wherein the location of the UE is within a second grid including a plurality of second grid elements; and receiving, by the base station, feedback information based on measurement of the reference signals.

In some embodiments, the channel information is information to aid in performing a channel measurement at the UE.

In some embodiments, the channel information includes at least one of: a location of a virtual transmission point (VTP) that appears to be transmitting the reference signal; a relative delay between propagation paths transmitted at two different first grid elements; a relative power value between propagation paths transmitted at two different first grid elements; or an angle of arrival (AoA) of a beam received at the UE.

In some embodiments, the method further involves transmitting, by the base station, to the UE, a request for radio frequency (RF) sensing to be performed by the UE, wherein the RF sensing is performed with reference to the plurality of second grid elements.

In some embodiments, the request for RF sensing to be performed by the UE further includes sensing configuration information for the UE.

In some embodiments, the sensing configuration information includes one or more of: a sensing waveform indication; sensing sequence information; time or frequency resource information for reference signals; an indication of the feedback information the UE should transmit to the base station; or a feedback reporting channel indication.

In some embodiments, the configuration information further includes identification of propagation paths from the base station to one or more first grid element in the first grid.

In some embodiments, the method further involves determining a map of objects in the geographical area to determine propagation paths between the base station and the UE.

In some embodiments, determining the map of objects involves performing ray tracing of propagation paths to determine whether detected objects are real objects or are reflections of real objects.

In some embodiments, the method further involves transmitting, by the base station, a data signal to the UE one on or more beams having propagation paths determined based on the map of objects.

In some embodiments, receiving, by the base station, feedback information based on the reference signals includes at least one of: a grid element identifier of a grid element of the second grid and a reference signal received power (RSRP) value; or a grid element identifier of a grid element of the second grid and channel state information.

In some embodiments, the plurality of second grid elements results from partitioning of the plurality of first grid elements.

According to a second aspect, there is provided a method of channel information acquisition for a telecommunication system including a base station serving a UE in a geographical area, the method involving: receiving, by the UE, from the base station, configuration information including an association of a location of the UE and channel information pertaining to a channel between the base station and the UE, wherein at least a portion of the geographical area is partitioned into a first grid including a plurality of first grid elements; receiving, by the UE, reference signals from the base station on one or more propagation paths, wherein the location of the UE is within a second grid including a plurality of second grid elements; and performing measurement of the received reference signals; and transmitting, by the UE, feedback information based on the measurement of the received reference signals.

In some embodiments, the channel information is information to aid in performing channel measurement at the UE.

In some embodiments, the channel information includes at least one of: a location of a VTP that appears to be transmitting the reference signal; a relative delay between propagation paths transmitted at two different first grid elements; a relative power value between propagation paths transmitted at two different first grid elements; or an AoA of a beam received at the UE.

In some embodiments, the method further involves receiving, by the UE, from the base station, a request for RF sensing to be performed by the UE, wherein the RF sensing is performed with reference to the plurality of second grid elements.

In some embodiments, the request for RF sensing to be performed by the UE further involves sensing configuration information for the UE.

In some embodiments, the sensing configuration information includes one or more of: a sensing waveform indication; sensing sequence information; time or frequency resource information for reference signals; an indication of the feedback information the UE should transmit to the base station; and a feedback reporting channel indication.

In some embodiments, the configuration information further involves identification of propagation paths from the base station to one or more first grid element in the first grid.

In some embodiments, transmitting, by the base station, feedback information based on the reference signals includes at least one of: a grid element identifier of a grid element of the second grid and a reference signal strength value; or a grid element identifier of a grid element of the second grid and channel state information.

In some embodiments, the method further involves receiving, by the UE, a data signal from the UE one on or more beams having propagation paths determined based at least in part on the feedback information.

In some embodiments, the plurality of second grid elements results from partitioning of the plurality of first grid elements.

According to a third aspect, there is provided a method of channel information acquisition for a telecommunication system including a base station serving a UE in a geographical area, the method involving: transmitting, by the base station, to the UE, configuration information including an association of a location of the UE and channel information pertaining to a channel between the base station and the UE, wherein at least a portion of the geographical area is partitioned into a first grid including a plurality of first grid elements; and transmitting, by the base station, a data signal to the UE based on the configuration information.

In some embodiments, the method further involves transmitting, by the base station, reference signals in the direction of the location of the UE on one or more propagation paths, wherein the location of the UE is within a second grid including a plurality of second grid elements and the plurality of second grid elements results from partitioning of the plurality of first grid elements; and receiving, by the base station, feedback information based on measurement of the reference signals.

According to a fourth aspect, there is provided a method of channel information acquisition for a telecommunication system including a base station serving a UE in a geographical area, the method involving: receiving, by the UE, from the base station, configuration information including an association of a location of the UE and channel information pertaining to a channel between the base station and the UE, wherein at least a portion of the geographical area is partitioned into a first grid including a plurality of first grid elements; determining, by the UE, a receive beam on which to receive a data signal based on the configuration information; receiving, by the UE, the data signal from the base station on a receive beam determined based on the configuration information.

In some embodiments, determining a receive beam on which to receive a data signal involves: receiving, by the UE, reference signals from the bases station on one or more propagation paths, wherein the location of the UE is within a second grid including a plurality of second grid elements and the plurality of second grid elements results from partitioning of the plurality of first grid elements; and transmitting, by the UE, feedback information based on measurement of the reference signals.

According to a fifth aspect, there is provided an apparatus that includes a processor and a computer readable medium. The computer readable medium has stored thereon computer executable instructions, that when executed, perform a method as described above. An example of such an apparatus might be a base station.

According to a sixth aspect, there is provided an apparatus that includes a processor and a computer readable medium. The computer readable medium has stored thereon computer executable instructions, that when executed, perform a method as described above. An example of such an apparatus might be a UE.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
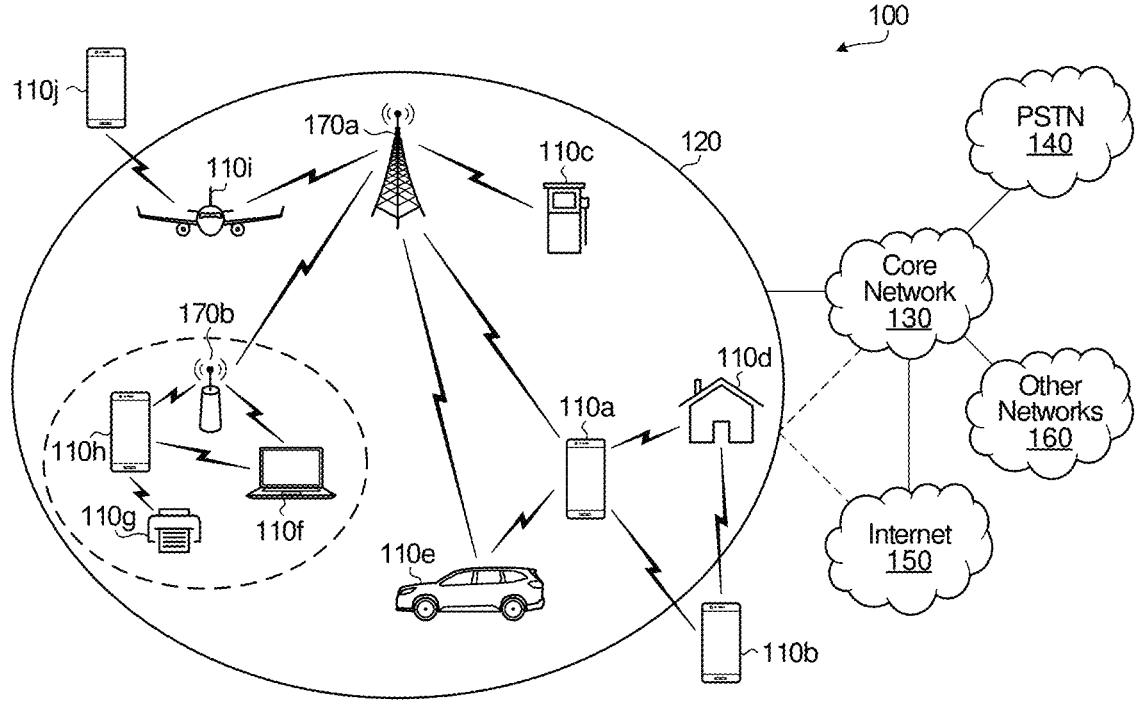
FIG. 1A is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/ processor readable storage media.

Beam acquisition for massive MIMO systems can be challenging at high frequencies such as millimeter wave (mmWave) and subTHz band (>100 GHz) due to the large overhead of control signaling and processing time needed when performing beam sweeping (due to beam sweeping overhead) via narrow beams. An increase in latency can also be another issue impacting beam acquisition at mmWave and subTHz frequencies.

When performing beam sweeping via narrow beams, the transmitter sends reference signals via the narrow beams in different directions while the receiver searches via narrow beams for reference signals transmitted by the transmitter, also in a number of different directions. Examples of a type of reference signal that may be transmitted by a transmitter, such as a base station, may be a channel state information reference signal (CSI-RS) or a positioning reference signal (PRS). An example of a type of reference signal that may be transmitted by a receiver, such as a user equipment (UE), may be a sounding reference signal (SRS). If only narrow beams are being used, then many beams may be needed, as opposed to when wide beams are used, fewer beams may be needed. Beam sweeping overhead involves a number of beam pairs (a transmitter beam and a receiver beam forming a beam pair) that are searched in order to find one or more beam pairs that have preferred characteristics (e.g., best signal strength) for data communication between the transmitter and receiver. Besides the number of beam pairs, the beam sweeping overhead also depends on a duration to perform the measurement (e.g. measurement of the receive signal strength). The time to perform the measurement may also depend on the sequence length. The variation in sequence length determines quality of the measurement. For example, a longer sequence length results in high quality and shorter length results in lower quality. However, a longer sequence length results in higher overhead. Therefore, there is a tradeoff between measurement quality and the amount of overhead. Note that with fixed duration per measurement of one beam-pair, the beam sweeping overhead is reduced when searching among fewer beam-pairs to find one or more beam pairs that have preferred characteristics (e.g., best signal strength).

Sensing technology may be used to perceive the environment in the area of a transmitter, which enables a transmission channel on at least one beam pair to be determined between the transmitter and receiver. In some implementations, if the propagation environment is known a priori, a mmWave channel can be estimated with higher accuracy and less overhead, especially in massive antenna arrays and for large bandwidth.

As compared to sub-6 GHZ communication systems, the propagation environment for mmWave and sub-THz consists of objects that act as reflectors as opposed to objects that may scatter a communication signal. Therefore, in the propagation environment for mmWave and sub-THz much of the signal energy is restricted to line-of-sight (LOS) paths and reflected paths.

Once the reflectors, e.g., walls and buildings, are located by the transmitter, channel coefficients can be calculated between the transmitter and receiver, i.e., angles of departure (AoDs) from the transmitter, angles of arrival (AoAs) at the receiver and gains of paths from the transmitter to the receiver for one or more paths therebetween.

Sensing of the environment can be used to assist beamforming, for example beam acquisition, as well as beam management. Sensing may enable minimizing, and possibly eliminating beam sweeping as part of the beam acquisition process. Sensing may enable minimizing channel state information (CSI) acquisition overhead and minimizing latency in the acquisition process. Sensing may also enable the transmitter, or the network the transmitter communicates with, to follow the receiver using channel predication. For example, as part of a sensing functionality the transmitter may be able to determine movement (speed and direction) of the receiver and based on such determined movement may be able to predict future movement of the receiver. Based on the determined movement and/or prediction of the movement, the transmitter may be able to estimate the channel for the determined movement and/or the predicted movement. Sensing may also enable proactive beam management. One aspect of beam management may be to establish and retain a transmit (Tx) beam from the transmitter side and receive (Rx) beam from the receiver side to form a transmit receive beam pair. Beam management may consist of at least one of beam training and beam tracking. The use of the expression beam training can include either or both of Tx beam training and Rx beam training.

Aspects of the present disclosure enable the determination of beamforming information and channel information for communication between a transmitter and receiver by using sensing information. Embodiments are provided that lower reference signal (RS) overhead and that lower latency as compared with traditional exhaustive beam training methods.

Aspects of the present disclosure may provide a channel information acquisition method for a telecommunication system including a transmitter and a receiver, for example a base station serving a user equipment (UE) in a geographical area. The method may include the base station transmitting to the UE configuration information that includes an association of a location of the UE and channel information pertaining to a channel between the base station and the UE. At least a portion of the geographical area is partitioned into a first grid that includes a plurality of first grid elements. The method may also include the base station transmitting reference signals in the direction of the location of the UE on one or more propagation paths. The location of the UE may be located within a second grid comprising a plurality of second grid elements. The UE performs measurement of the reference signals and transmits feedback to the base station. The base station may then receive feedback information based on measurement of the reference signals performed at the UE.

Some embodiments may provide a two-step channel information acquisition method. The two-step channel acquisition method involves using sensing by the network (which includes the transmitter and/or the receiver) to construct a radio signal (RF) propagation path map, which may provide information for generating initial beamforming and provide information for updating the initial beamforming.

A first step may involve performing sensing in the environment local to the transmitter to determine signal path propagation. The sensing enables generation of a RF propagation path map, thereby identifying possible propagation paths in the environment. The sensing may also enable determination of an association between a location of a receiver and channel characteristics between the transmitter and the receiver via a direct propagation path and possible reflection propagation paths.

A second step may involve channel information acquisition by additional sensing. In some embodiments, the sensing may be performed using a higher resolution than the sensing performed in the first step. The RF propagation map generated in the first step may be used to obtain a more accurate location of the receiver, AoA at the transmitter and/or receiver, AoD at the transmitter, and/or receiver and other sensing information for beamforming and improving the RF propagation map. In some embodiments, the sensing in the second step may be used in connection with ray tracing for improving location information of the receiver, AoA information at the transmitter and/or receiver, and AoD information at the transmitter and/or receiver.

Figure 1B:
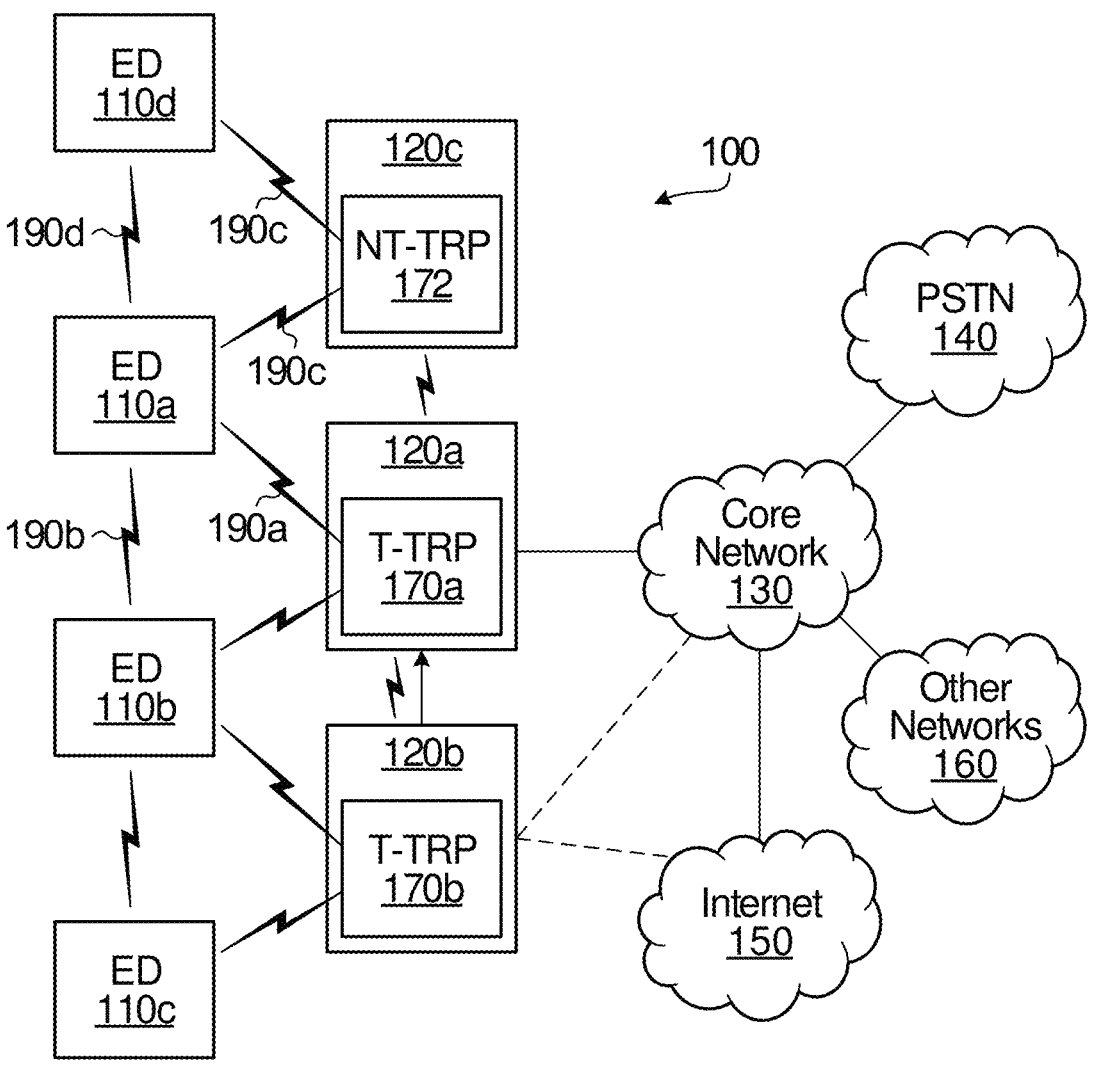
FIG. 1B is another schematic diagram of a communication system in which embodiments of the disclosure may occur.
Figure 2:
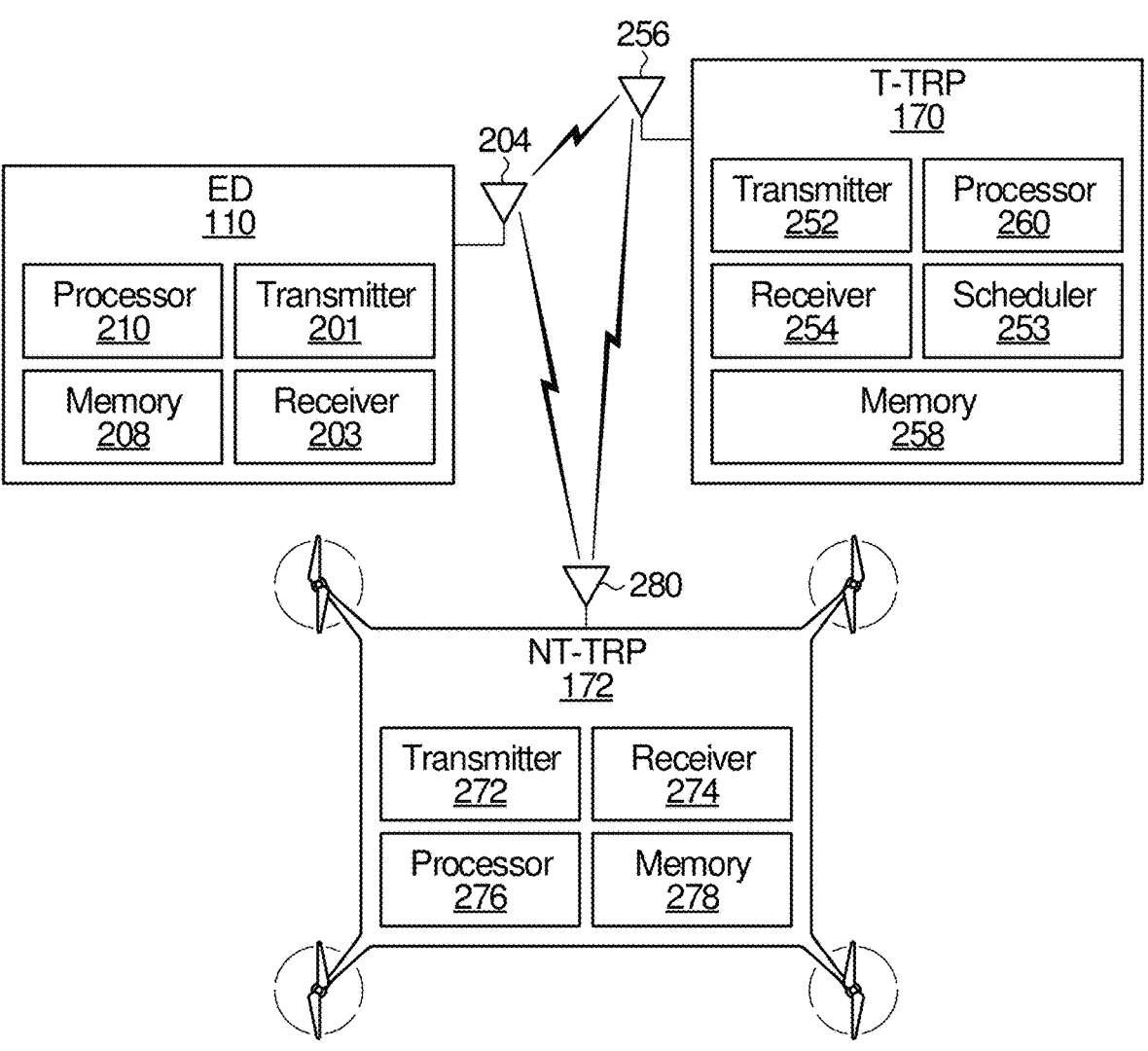
FIG. 2 is a block diagram illustrating example electronic devices and network devices.

FIGS. 1A, 1B, and 2 provide context for the network and devices of a wireless communication system that may implement aspects of the mobility management methods of the present disclosure.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-110j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

FIG. 1B illustrates an example wireless communication system 100 (hereinafter referred to as system 100) which includes a network in which embodiments of the inter-cell mobility management methods of present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

The communication system 100 may provide a wide range of communication services and applications (such as earth monitoring, remote sensing, passive sensing and positioning, navigation and tracking, autonomous delivery, and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such technologies.

The EDs 110*a*-110*c* communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110*a*-110*c* communication with one or more of the T-TRPs 170*a*-170*b* or NT-TRPs 172, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

FIG. 2 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IoT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 2, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire.

Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1A or 1B). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices. While the figures and accompanying description of example and embodiments of the disclosure generally use the terms AP, BS, and AP or BS, it is to be understood that such device could be any of the types described above.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 3:
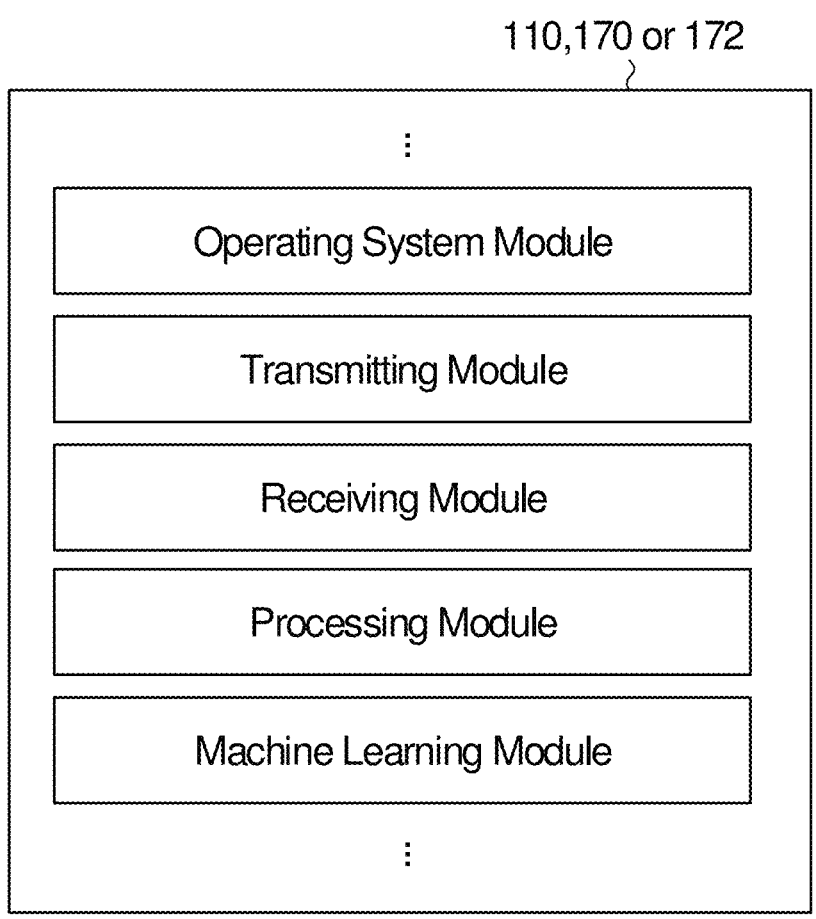
FIG. 3 is a block diagram illustrating units or modules in a device in which embodiments of the disclosure may occur.

One or more steps of the embodiment methods provided herein may be performed by corresponding units or modules, according to FIG. 3. FIG. 3 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

For future wireless networks, a number of the new devices could increase exponentially with diverse functionalities. Also, many new applications and new use cases in future wireless networks than existing in 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be stand-alone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data collecting, processing and usage operations are performed in a unified framework or a different framework.

Figure 4A:
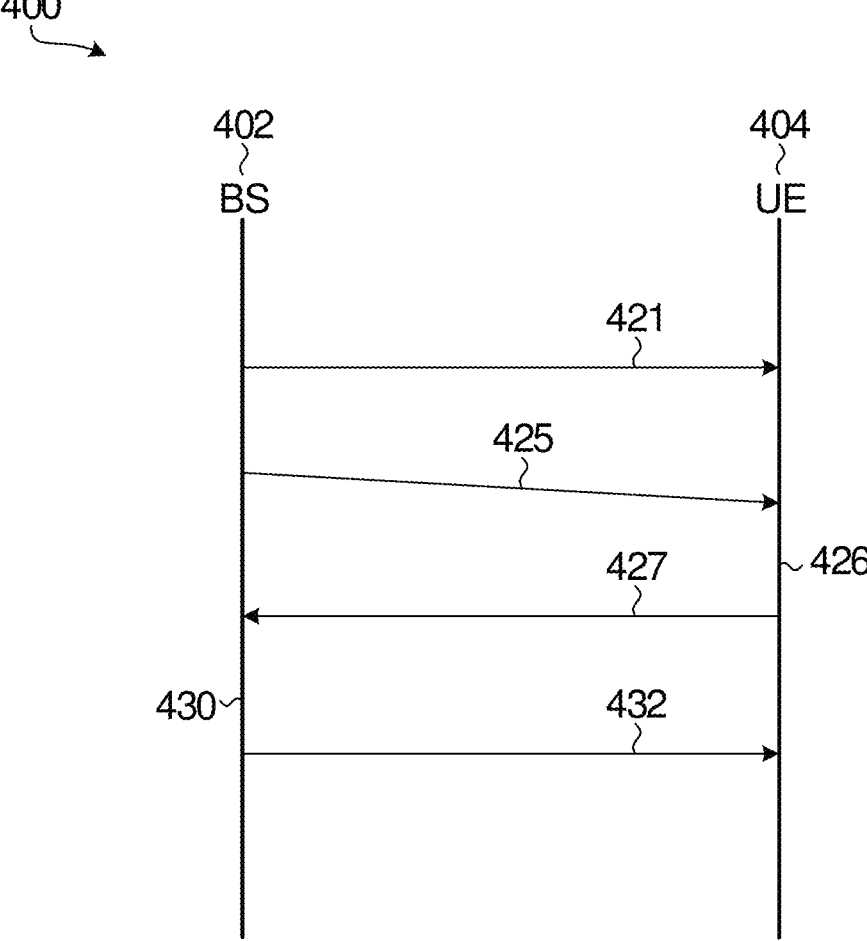
FIG. 4A is an example of a signaling flow diagram for a method of sensing and beam measurement/channel measurement according to aspects of the present disclosure.

FIG. 4A illustrates a signaling flow diagram 400 between a transmitter and a receiver for environment aware beam management that may enable channel information acquisition according to an aspect of the present disclosure. In the example of FIG. 4A, the transmitter is a base station (BS) 402 and the receiver is a user equipment (UE) 404. The base station 402 may initially have some knowledge regarding the geographical area surrounding the base station 402. In some embodiments this may be obtained by RF environment sensing performed by the base station. Examples of how RF environment sensing may be performed in some embodiments will be described in further detail below. The BS 402 may partition some or all of the geographical area into a two dimensional (2D) or three dimensional (3D) grid. Knowledge that the BS 402 may have is an RF propagation path map. In some embodiments, the RF propagation map may be based on the RF environment sensing information performed by the BS 402. Based the RP propagation map, the BS 402 may select a general direction of the UE, i.e. a particular portion of the grid, for further detailed environment sensing to further define the RF propagation path map.

The physical space, and the eventual generated RF propagation path map, may refer to a whole geographical area or only a portion of a geographical area served by a single transmitter or by multiple transmitters. In some embodiments, the BS 402 may perform RF environment sensing that allows the BS 402 to obtain a quick and somewhat coarse channel propagation information based on reflection of transmitted reference signals. Based on the quick and coarse channel propagation information, the BS 402, or the network the BS 402 is in communication with, may select a subset of grid elements in the grid that are determined to be in the direction of the UE 404. The subset of grid elements in the grid correspond to a set of propagation paths that may be used by the BS 402 to send reference signals to the UE 404 to be measured by the UE 404. Once the reference signals have been measured, the UE 404 can send feedback information to the BS 402 that the BS 402 can used to further improve the RF propagation path map and/or determine transmit receive beam pair for a downlink channel between the BS 402 and UE 404. In some embodiments, the BS 402 subdivides the grid elements into smaller grid elements that can be used for possible propagation paths for transmitting reference signals as part of beam measurement and/or channel measurement. These smaller grid elements may collectively be referred to as a second grid. The smaller elements in the second grid may be used to obtain information pertaining to beam measurement or channel measurement. In some embodiments, the BS 402 does not partition the grid elements in the grid into smaller grid elements, but maintains the size of the grid elements from the grid that can be used for transmitting reference signals. In such a case the second grid elements are the same size as the grid elements. Therefore, it may be possible to obtain beam measurements and channel measurements with respect to grid elements that are the same size of the grid elements or that are smaller than the grid elements.

The base station 402 transmits 421 configuration information that may pertain to a relationship between the grid and the second grid, for example the relationship between the size of the grid elements in the grid and the second grid, wherein the size of the grid elements in the second grid can be equal to or smaller than that in the grid.

After the BS 402 or network has generated the RF propagation map and has chosen particular propagation paths between the BS 402 and the UE 404, the configuration information transmitted at step 421 may include identifiers for the grid elements in the grid used during the beam measurement and/or channel measurement for which the BS is transmitting reference signals in the direction thereof. In some embodiments, the configuration information pertaining to the first grid is transmitted on a broadcast channel to one or more UEs or on a unicast channel to a particular UE. The configuration information may be transmitted by radio resource control (RRC) signaling after the UE 404 has completed initial access (IA) to the network and has established a radio connection with the network in a CONNECTED state.

In some embodiments, at step 421, the configuration signaling transmitted by BS 402 may include a request to activate the UE 404 to take part in a beam measurement and/or a channel measurement to further improve the RF propagation map. In some embodiments this request may be transmitted using RRC signaling or other types of DL channel signals, such as DCI or media access control-control element (MAC-CE) on downlink control information (DCI).

In some embodiments, at step 421, the configuration signaling transmitted by BS 402 may indicate an angular difference value between various AoAs for beams arriving at the UE 404, i.e. the angle differential between propagation paths, to assist in channel measurement and/or receiver beam training.

In some embodiments, at step 421, the configuration signaling transmitted by BS 402 may include a relative delay between reference signals that may be received at the UE from different directions, as well as AoDs from the BS, for each candidate propagation path, which may be used by the UE to assist in performing channel measurements.

In some embodiments, the configuration information sent by the BS 402 to the UE 404 in step 421 may include configuration information that identifies the type of information the UE 404 should feedback to the BS 402 and how it should be feedback to the BS.

In some embodiments, the configuration information transmitted in step 421 is transmitted by RRC. In some embodiments, some or all of the configuration information transmitted in step 421 is transmitted by MAC-CE.

While the various configuration signaling described above are all described as occurring at step 421, it should be understood that the various configuration signaling may be sent together, or may be sent separately around the same time.

The BS 402 may optionally transmit a request to the UE 404 to activate the UE 404 to take part in a beam measurement and/or a channel measurement to further improve the RF propagation map. The reference signals are transmitted 425 by the base station 402 using propagation paths in a direction of the grid elements that were determined by the BS 402. As described, the grid elements of the second grid may be the same size as the grid elements or small than the grid elements. Such an activated, or "on-demand", based beam measurement and/or channel measurement may provide a more accurate channel acquisition and/or improve the detail of the RF propagation path map. The beam measurement and/or channel measurement may result in higher resolution and accuracy in the RF propagation path map. As part of the beam measurement and/or channel measurement, the BS 402 transmits 425 reference signals to be received at the UE 404. An example of a type of reference signal is a channel state information reference signal (CSI-RS). Other examples of reference signals may include a sensing reference signal or a positioning reference signal. The reference signal is measured 426 at the UE 404 and feedback beam management (BM) information and/or CSI-RS information is transmitted 427 as feedback to the BS 402 to enable the BS 402 to update the RF propagation map and perform beam acquisition with the UE 404.

It should be understood that while it is described above the BS 402 performs particular functionality, in some embodiments, the network that the BS 402 is a part of may perform some of the functionality. For example, the BS 402 may perform the sensing and then the BS 402 provides resulting sensing information to the network and the network generates the RF propagation path map and provides the RF propagation path map to the BS 402. The network may have processing ability to perform the function at the BS 402 or remotely from the BS 402.

After the BS 402 receives the feedback signal, the BS may update 430 the RF propagation path map based on the feedback information.

At some subsequent point in time based on a most recently updated version of the RF propagation path map, the BS may select 430 one or more beams for data transmission to the UE 404 on a downlink channel on one or more beams that have been selected based on the RF propagation path map. In some embodiments, the downlink channel may be a physical downlink shared channel (PDSCH) or a physical downlink control channel (PDCCH) or another physical channel. The BS 402 may then transmit 432 the data transmission to the UE 404.

Figure 4B:
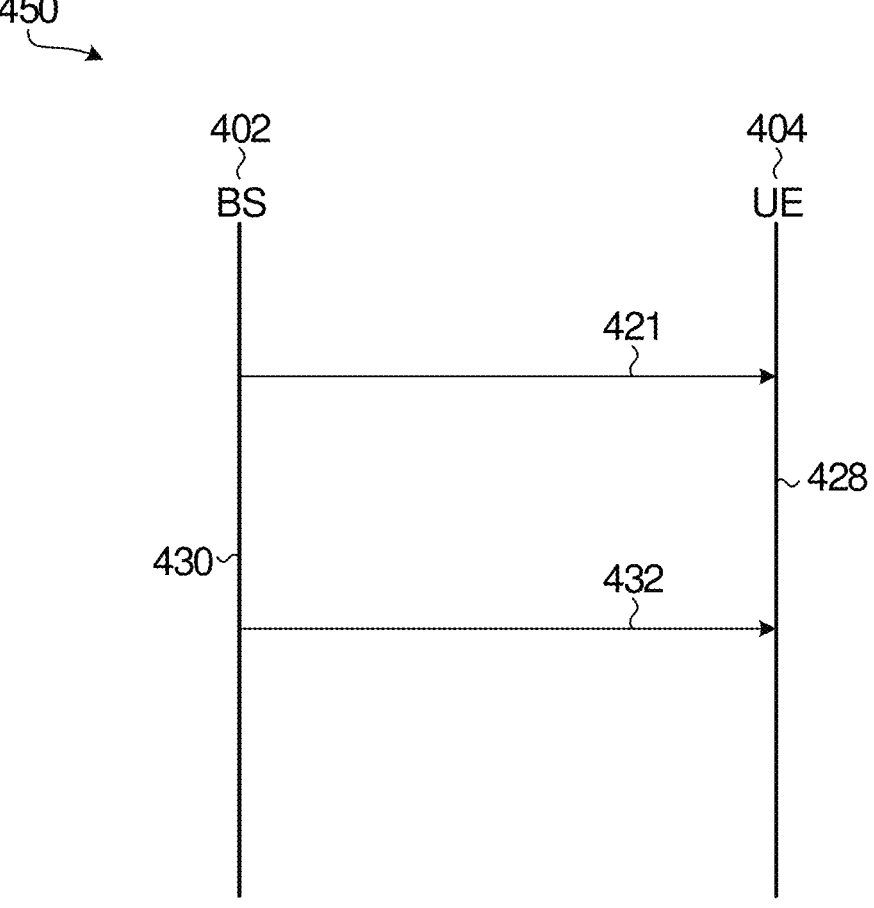
FIG. 4B is another example of a signaling flow diagram for a method of sensing and beam measurement/channel measurement according to aspects of the present disclosure.

FIG. 4B illustrates a signaling flow diagram 450 between the BS 402 and the UE 404 for environment aware beam management according to another aspect of the present disclosure. The signaling flow diagram 450 is another process that includes the base station transmitting configuration information to the UE and the UE determining a receive beam for a transmit receive beam pair for use in downlink channel communication based at least in part on the configuration information received from the BS. The BS 402 transmits 421 configuration information to the UE 404, which enables determination of an association between a location of the UE 404 and channel characteristics for a channel between the BS 402 and the UE 404 via a direct propagation path and possible reflection propagation paths. Based on the configuration information, the UE 404 may determine 428 a channel based on a transmit receive beam pair between the BS 402 and the UE 404. As part of determining 428 the channel, the UE 404 may determine a receive beam direction at the UE 404 for use in the transmit receive beam pair. In some embodiments, the receive beam may be selected by using a look-up table. The look-up table for example may have a set of predefined receive beam angles corresponding to particular information received in the configuration information. In some embodiments, the receive beam may be selected based on transmitting and receiving a sensing signal.

At some subsequent point in time based on a most recently updated version of the RF propagation path map, the BS may select 430 one or more beams for data transmission to the UE 404 on a downlink channel on one or more beams that have been selected based on the RF propagation path map. In some embodiments, the downlink channel may be a physical downlink shared channel (PDSCH) or a physical downlink control channel (PDCCH) or another physical channel. The BS 402 may then transmit 432 the data transmission to the UE 404.

In some embodiments, the BS 402 may perform some initial RF sensing to determine the RF propagation path map information, as will be described in further detail with regard to FIG. 11.

Figure 5A:
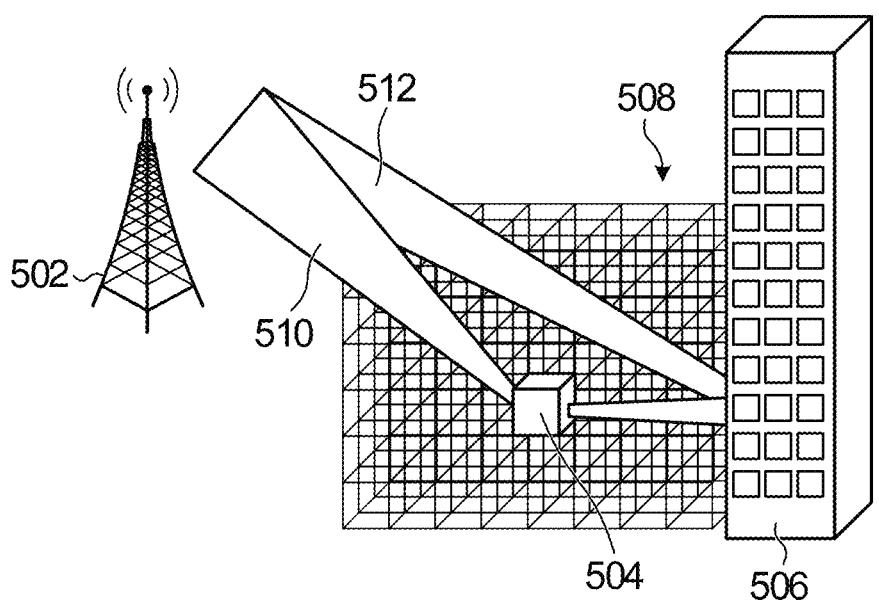
FIGS. 5A and 5B are examples of grids that may be used to determine a radio frequency (RF) propagation path map and beam measurement and channel measurement according to an aspect of the present disclosure.
Figure 5B:
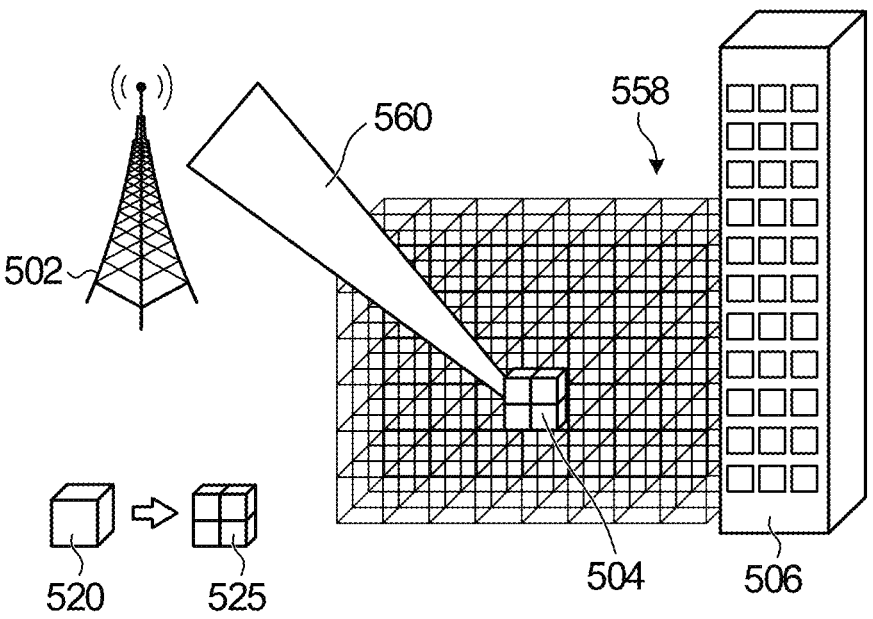

FIGS. 5A and 5B illustrate examples of how the physical space may be partitioned for use in RF sensing and further partitioned for use for beam measurement and/or channel measurement.

FIGS. 5A and 5B each show a BS 502 and a UE 504 in proximity to one another. There is also a building 506 in the area that is acting to reflect some of the beams from the BS 502.

In FIG. 5A, a portion of the physical area has been partitioned into a first 3D grid 508, which appears as a cube-like wire-like structure. A first beam 510 can be seen being transmitted along a first propagation path that is substantially a direct path along a line of sight (LoS) to the UE 504. A second beam 512 can be seen being transmitted along a second propagation path that is reflected off of the building 506 and eventually reaches the UE 504. Locations of individual grid elements in the 3D grid can be represented as an azimuth angle or a zenith angle and therefore the 3D grid can be represented as a range of azimuth angle or zenith angle.

In FIG. 5B, the first grid as shown in FIG. 5A has been partitioned into smaller grid elements. The smaller grid elements can collective be referred to as the second grid. Grid element 520 is representative of an individual grid element from the first grid 508 and is shown compared to a set of 8 grid elements that collectively are the same size as grid element 520 and that are representative of 8 grid elements from the second grid 558. This size comparison would occur as a result of the length, width and depth of the second grid element being ½ the length, width and depth of the first grid element. While the entire first grid appears to have been further partitioned in FIG. 5B, this may not always be the case. In some embodiments, only a portion of the first grid may be further partitioned. In some embodiments, a relationship of the size of the grid elements in the first grid to the size of the grid elements in the second grid is provided to the UE so that the UE can determine the size of the grid elements of the second grid. A beam 560 can be seen being transmitted along a first propagation path that is substantially a direct path along a LoS to the UE 504.

It should also be noted that while FIG. 5B illustrates the second grid elements are small than the first grid elements, as described above, in some embodiments the first grid is not further partitioned into a small set of grid elements. In such embodiments, the grid and grid elements used in an RF sensing step may be the same as used in beam measurement and/or channel measurement.

In some embodiments, the resolution of the first grid elements and the second grid elements is configured based on one or more of a channel type, antenna type, sensing resolution and desired accuracy.

The size of the grid elements for the first and second grids may be a uniform size for or a non-uniform sizes. Non-uniform sized grid elements may be useful for some scenarios such as where the sensing resolution requirements are different in different areas or where there is non-uniform UE distribution or where the sensing resolution is different in different areas. When the size of the grid elements of the first grid and/or the second grid have a non-uniform size, the grid element configuration information may be unicast to individual UEs or multi-cast to groups of UEs that share a same non-uniform size.

When the size of the grid elements of the first grid and/or the second grid have a uniform size, the grid element configuration information may be broadcast to all UEs being served by the BS.

In some embodiments, the size of the grid elements of the first grid and/or the second grid that partition the environment are cell specific, i.e. for use anywhere in the cell. When this is the case, the configuration information indicating the size of the grid elements of the first grid and/or the second grid is broadcast to all UEs in the cell. In some embodiments, the size of the grid elements of the first grid and/or the second grid are UE-group specific. When this is the case, the configuration information is broadcast to a group of UEs in the cell, but not necessarily all UEs in the cell. In some embodiments, the first grid and/or the second grid consists of a single set of grid elements. In some embodiments, first grid and/or the second grid each consist of multiple gird elements. The multiple sets of gird elements may correspond to a multipath channel. In some embodiments, the first grid and/or the second grid consists of continuous and/or discontinuous sets of grid elements.

In some embodiments, subsequent to an RF environment sensing step the BS may use configuration information signaling to the UE to indicate an angular difference value between various AoAs for beams arriving at the UE, i.e. the angle differential between propagation paths, to assist in channel measurement and/or receiver beam training. In some embodiments, the angle differentials may be relative to a particular propagation path.

Figure 6:
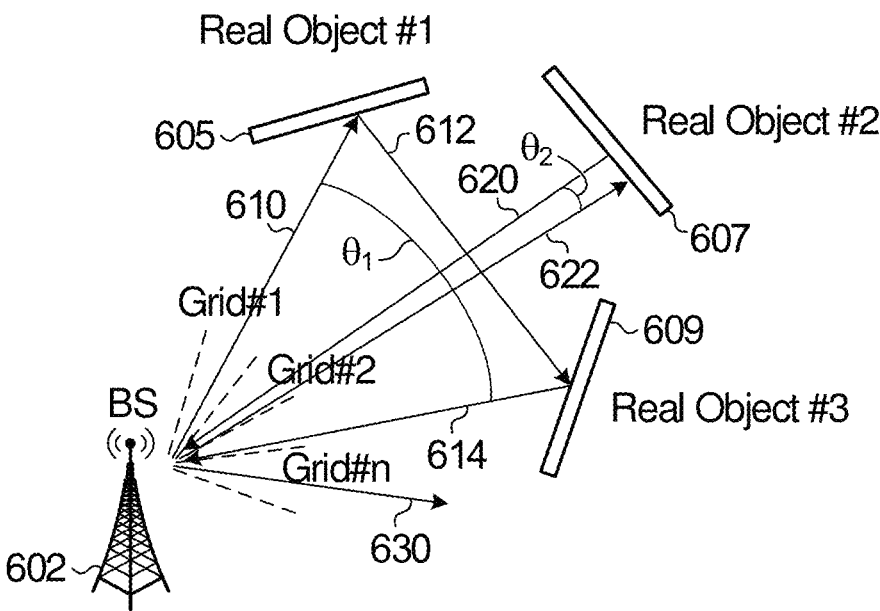
FIG. 6 is an example of why multiple reflections of a transmit beam by multiple objects in an environment of a base station may cause the base station to detect objects that do not provide an accurate map of the environment.
Figure 7:
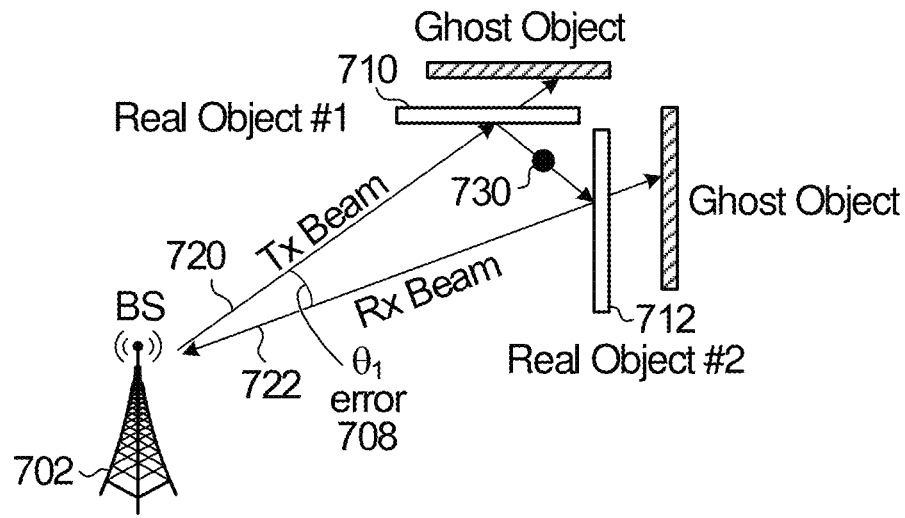
FIG. 7 is a schematic diagram illustrating an example of how multiple reflections of a transmit beam, when an amount of misalignment between a transmit and a receive beam is unknown may affect determining the location of an object.

When the BS has performed RF sensing, the BS, or the network, may generate the RF propagation path map of the physical space once the quick and coarse reflection channel propagation information has been obtained by RF environment sensing. This information can then be used at any subsequent point in time when performing beam measurement and/or channel measurement. Based on the generated RF propagation path map, the BS may determine the general UE location. The RF propagation path map of the area local to the BS can be constructed by a BS or multiple network devices in the cell transmitting sensing signals. Any of the BS, one or more of the network devices or the network can then process the reflected signals to construct the RF propagation path map. The BS transmits sensing signals and receives the reflection signals from objects and/or UEs. In some embodiments, the UE may passively reflect the sensing signal from the BS. In some embodiments, the UE may detect the sensing signal from the BS and actively send a signal to the BS to indicate the presence of the UE. The BS or network should be able distinguish passive objects and UEs from ghost objects or ghost UEs. Passive objects are objects such are walls or buildings that act to reflect the sensing signal. Ghost objects or ghost UEs are not real objects or UEs, but result from a sensing signal that has reflected by the object or the UE and then off another reflecting surface so that it appears that an object or a UE is located where there actually is no object or UE. Examples of ghost objects or UEs that are not real target UEs for communications are shown in FIGS. 6 and 7.

There are various reasons that ghost objects and ghost UEs may be detected by the BS or the network. One reason is due to multiple reflections between the BS and the objects or the UEs before being received back at the BS. The path of reflected beams may be determined by ray tracing. A signal is considered to be a ray that can be traced from a source location, which in this case is the BS. The path of the ray can be determined being reflected off of one or more objects or UEs between being transmitted by the BS and received back at the BS.

Another reason that ghost objects and ghost UEs may be detected by the BS or the network is that the signal strength of the multiple bounce reflected rays is so strong that it can result in a relatively high SNR at receive beam of the BS.

A further reason ghost objects and ghost UEs may be detected by the BS or the network is that the transmit and receive beams for sensing at the transmitter are not aligned with one another, i.e. a beam generated by a beamformer used to transmit a reference signal does not have the same directionality as a beam generated by a beamformer used to receive a signal.

FIG. 6 illustrates an example of a BS 602 transmitting a reference signal for RF environment sensing. The BS 602 is shown transmitting reference signals in beams in three directions. The reference signal on a first beam 610 is transmitted in a direction of a first grid element. The reference signal on the first beam 610 is reflected off a first real object 605 as reflected beam 612. The reflected beam 612 is reflected off a third real object surface 609 as reflected beam 614. The reflected beam 614 is received back at the BS 602. Due to the multiple reflections off second and third real objects 605 and 609, the direction of the transmit and receive beams are spaced apart by a large angle $\theta_1$, which is large because there they are from substantially different directions. Because the reference signal is received back from a different direction than the direction the reference signal was transmitted, this is an indication that the BS 602 is perceiving a ghost object in the form of the reflection from the third real objection 609. Therefore, if the angle $\theta_1$ is larger than a threshold value, this would be an indication that an object being detected is not a real object reflecting directly back to the BS, but is a ghost object that is reflecting back the reference signal that has been reflected off more than one object.

The reference signal on a second beam 620 is transmitted in a direction of a second grid element. The reference signal on the first beam 620 is reflected off a second real object 607 as reflected beam 622. The reflected beam 622 is received back at the BS 602. Due to the reflections off only second real object 607, the direction of the transmit and receive beams are spaced apart by $\theta_2$, which is small because there they are substantially the same direction. Because the reference signal is received back from substantially the direction than the direction the reference signal was transmitted, this is an indication that the BS is detecting a real object in the form of the reflection from the second real objection 607. Therefore, if the angle $\theta_1$ is smaller than a threshold value, this would be an indication that an object being detected is a real object reflecting directly back to the BS 602.

The reference signal on a third beam 630 is transmitted in a direction of an nth grid element. The reference signal on the third beam 630 does not reflect off any real objects and therefore a reflected beam is not received at the BS corresponding to the transmitted reference signal.

While FIG. 6 is described with reference to objects, any of the first object 605, second object 607 or third object 609 may be a UE. For example, a reference signal transmitted in the direction of a first grid element may be reflected off of a first UE 605 in the direction of a third object 609 and the third object 609 may reflect the reference signal back to the BS 602 such that the angle $\theta_1$ is larger than a threshold and the BS 602 is detecting a ghost object and not directly from the first UE 609. A reference signal transmitted in the direction of a second grid element may be reflected off of a second UE back to the BS such that the angle $\theta_2$ is smaller than a threshold and the BS is detecting the real second UE.

There are several ways to determine if objects are real objects/real UEs or ghost objects/ghost UEs or whether there is a potential issue with the alignment of the transmit beam and receive beam at the BS. If the object/UE is detected and there is imperfect transmit beam and receive beam alignment, there will be a residual error due to the imperfect alignment.

For instance, the BS may not know an exact amount of transmit beam-receive beam angle difference resulting from the misalignment of the transmit beam and receive beam at the BS. To avoid such uncertainty, additional propagation paths may be used during the beam measurement and/or channel measurement.

FIG. 7 illustrates an example of a BS 702 transmitting a reference signal on a transmit beam 720 and receiving a reflection of the reference signal on a receive beam 722. The reference signal is reflected off a first real object 710 and then a second real object 712 before being detected by the receive beam 722. Due to the close proximity of the of two surfaces that the reference signal is reflected by, the transmit beam and the receive beam are separated by angle $\theta_1$ 708. Because angle $\theta_1$ 708 is close to a threshold value that may differentiate between whether the reflected beam is reflected from a real object or is reflected from a ghost object, the BS may not be able to interpret the reflected signal properly. The angle $\theta_1$ 708 may be a result of a misalignment between the transmit beam and the receive beam or as a result of an object, which is not actually there, at a position between the two reflecting surfaces 710 and 712, as indicated at 730 or it may appear that a ghost object is detected.

In some embodiments, the BS may actively scan over an angular range with a particular transmit beam as part of the sensing to obtain RF environment information. The BS may know a relative angle between the transmit beam and the receive beam as well as a distance between the BS and an object in the surrounding environment. The BS may know the distance between the BS and the object based on previous sensing performed by the BS. Geometry assisted signal processing may be used to determine the RF propagation path map, which can further assist beamforming that is performed on the reference signals.

Figures 8, 9:
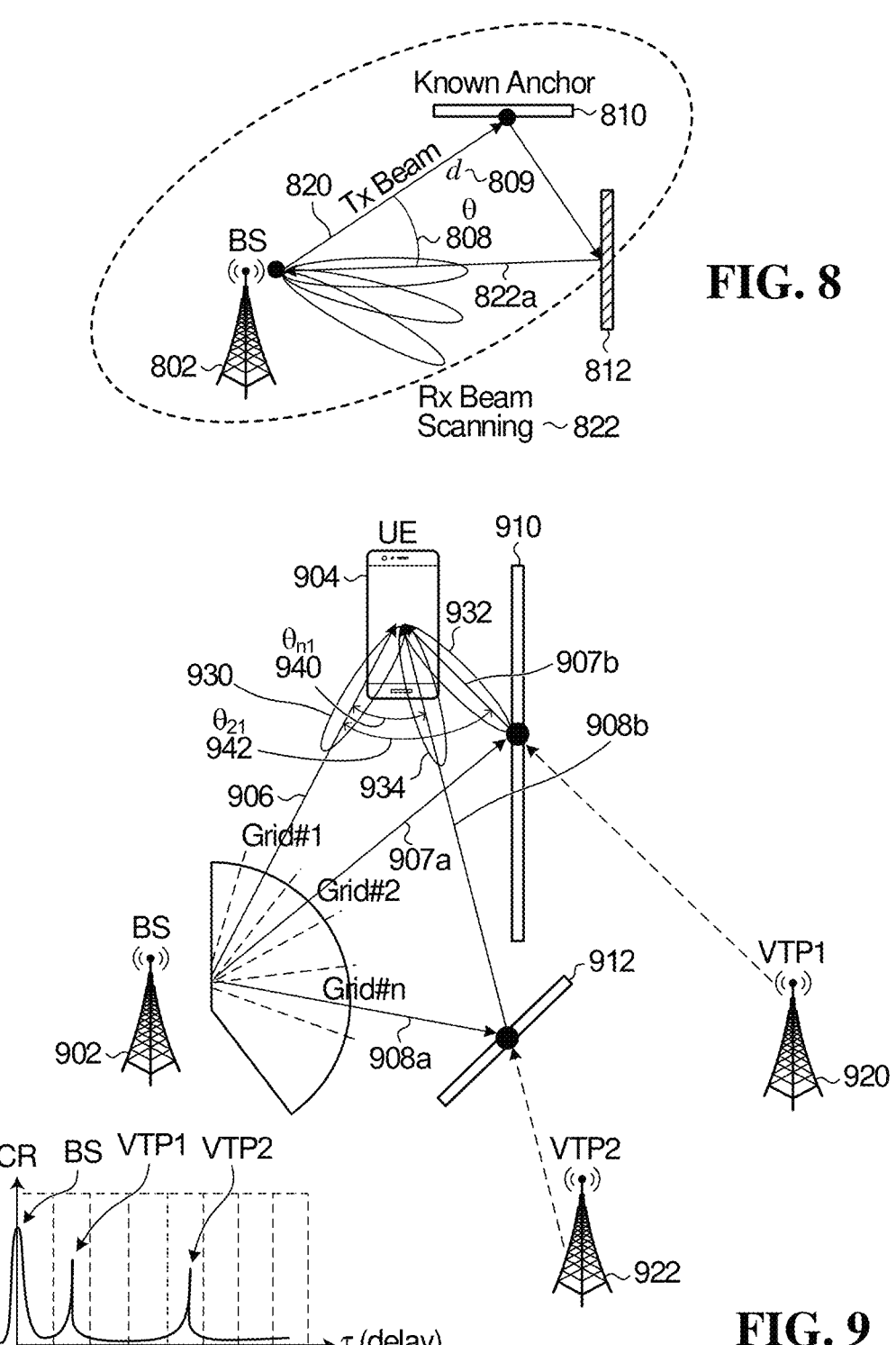
FIG. 8 is a schematic diagram illustrating an example of how geometry assisted signal processing may be used to determine the RF propagation path map according to an aspect of the present disclosure.
FIG. 9 is a schematic diagram illustrating an example of transmit beams for beam measurement or channel measurement used for beam measurement and/or channel measurement may result in a user equipment (UE) detecting virtual transmit points due to reflection of the transmit beams.

FIG. 8 illustrates an example of a BS 802 transmitting a reference signal on a transmit beam 820 and receiving a reflection of the reference signal on a one or more receive beams 822. The reference signal is reflected off a first real object 810 and then a second real object 812 before being detected by the one or more receive beams 822. Due to the reflection from the first object 810 to the second object 812, the transmit beam and each receive beam is separated by angle. In FIG. 8, the angle between the transmit beam and one of the receive beams 822a is angle $\theta_1$ 808. Based on the angle $\theta_1$ 808 and the known distance d 809 between the BS 802 and the first real object 810, geometry assisted signal processing may be used to determine a position of real object 812 in the RF propagation path map.

The signaling information of relative AoAs that may be used to indicate potential multipath channels at the UE side may assist channel measurement and receive beam training at the UE side. Providing this information may alert the UE to potential directions that a reference signal may be received resulting from reflections of the beam the reference signal was transmitted upon.

In some embodiments, the BS may provide the UE configuration information that includes a relative delay between reference signals that may be received at the UE from different directions, as well as AoDs from the BS, for each candidate propagation path, which may be used by the UE to assist in performing channel measurements.

A propagation path that corresponds to a reference signal associated with either an AoA at the UE or a AoD at the BS may be used to determine a location of a virtual transmission point (VTP). A VTP is a representation of a BS assuming that a BS were in a direct LoS path to the UE. The location of the VTP can be determined based on the AoA of the reference signal at the UE at the delay using ray tracing. In fact, the reference signal from the BS is reflected off at least one object as will be shown in the example of FIG. 9 described below.

When using the relative AoA for each propagation path at the UE side to assist UE receive beam training, a reference point that the relative AoA angle is relative to is selected. In some embodiments, the reference point may be a LOS path, and therefore the AoA is provided relative to the LoS path. In some embodiments, the reference point may be selected as an absolute orientation angle, and therefore an AoA is provided relative to the absolute reference point angle.

The relative AoA may include an angle value that is expressed in both an azimuth direction and a zenith direction, or either in a azimuth direction or in a zenith direction.

In some embodiments, the relative delay may be used to determine a distance between the UE and a virtual transmission point (VTP).

FIG. 9 illustrates an example a transmitter, in this case a BS transmitting reference signals to a UE 904. A first reference signal is transmitted on a first transmit beam of the BS 902 in the direction of grid element #1. The UE 904 receives the first reference signal on a first receive beam 930. The first reference signal is on a direct LoS path from the BS 902 to the UE 904. The AoA of the first reference signal on the first received beam 930 can act as the reference point for indicating relative AoAs of other possible beams with references signals that could be received at the UE 904. A second transmit beam 907a from the BS 902 includes a second reference signal that is transmitted in the direction of grid element #2 and is reflected off a first object 910 and continues to the UE 904 on reflected transmit beam 907b. The UE 904 receives the second reference signal 932 on a second receive beam 932. The second receive beam 932 has an AoA at the UE 904 that can be expressed as $\theta_{21}$ 940, which is the angle for the second receive beam 932 relative to the first receive beam 930. The angle $\theta_{21}$ 940 makes it appear that the reference signal on the second receive beam, 932 is coming along a direct path from a first virtual transmit point (VTP1) 920, even though it is actually coming from the BS 902. Because the second reference signal on the second transmit signal 907a is reflected off the first object 910, there is a delay with respect to the first reference signal due to the additional distance that the second reference travels. The additional distance results in a delay of $\tau_1$ with regard to the first reference signal received on the first received beam 930.

A third transmit beam 908a from the BS 902 includes a third reference signal that is transmitted in the direction of grid element #n and is reflected off a second object 912 and continues to the UE 904 on reflected transmit beam 908b. The UE 904 receives the third reference signal on a third receive beam 934. The third receive beam 934 has an AoA at the UE 904 that can be expressed as $\theta_{n1}$ 942, which is the angle for the third receive beam 934 relative to the first receive beam 930. The angle $\theta_{n1}$ 942 makes it appear that the reference signal on the third receive beam, 934 is coming along a direct path from a second VTP (VTRP2) 922, even though it is actually coming from the BS 902. Because the third reference signal on the third transmit signal 908a is reflected off the second object 912, there is a delay with respect to the first reference signal due to the additional distance that the third reference travels. The additional distance results in a delay of $\tau_2$ with regard to the first reference signal received on the first received beam 930.

Table 1 below illustrates an example of configuration information that the BS 902 may provide the UE 904 with regard to the example of FIG. 9. The configuration information includes a candidate grid identifier (ID) for a propagation path that a reference signal is transmitted in the direction thereof, an identification of the transmitter (either real or virtual transmitter from the receiver perspective) that it appears the reference signal may be transmitted from, a delay that may be experienced at the UE 904 that is relative to a reference signal that has a shortest time from the BS 902 and an AoA at the UE 904 relative to the reference signal that has the shortest time from the BS 902.

Therefore, with regard to the example of FIG. 9, for a propagation path directed to candidate grid #1, the configuration information includes the information that the reference signal appears to be coming from the BS 902, there is 0 delay and 0 relative AoA angle, meaning that this propagation path is acting as the reference point for other propagation path's delay and relative AoA. For a propagation path directed to candidate grid #2, the configuration information includes the information that the reference signal appears to be coming from VTP1 920, there is $\tau_1$ delay and $\theta_{21}$ relative AoA angle. For a propagation path directed to candidate grid #n, the configuration information includes the information that the reference signal appears to be coming from VTP2 922, there is $\tau_2$ delay and $\theta_{n1}$ relative AoA angle.

TABLE 1

| Signaling information for Step 1 | | | |
|---|---|---|---|
| Candidate Grid ID# | Transmitter# | Delay/Range | AoA |
| 1 | TRP | 0 | 0 |
| 2 | VTP1 | $\tau_1$ | $\theta_{21}$ |
| n | VTP2 | $\tau_2$ | $\theta_{n1}$ |

The configuration information that is shown in Table 1 may be generated by the BS 902 or the network as a result of the RF environment sensing. As the BS or network can determine where objects that reflect a beam transmitted by the BS and has a general indication of where the UE may be, the BS or network can determine potential propagation paths, either directly or via a reflection off a known object based on the knowledge of the general indication of where the UE may be and other objects in the environment. Therefore, based on information that is determined in an RF sensing step, the configuration information can be provided at the end of the RF sensing step or prior to sending the beamformed reference signals that can be used by the UE to aid in beam measurement and/or channel measurement on the beamformed reference signals.

The configuration information may more generally be described as including an association of a location of the UE and channel information pertaining to a channel between the base station and the UE. The location of the UE may be expressed in the form a grid element in a grid resulting from at least a portion of the geographical area being partitioned into a first grid including a plurality of the first grid elements. In some embodiments, channel information may include information such as a location of a virtual transmission point (VTP) that appears to be transmitting the reference signal; a relative delay between propagation paths transmitted at two different first grid elements; a relative power value between propagation paths transmitted at two different first grid elements; or an AoA of a beam received at the UE.

In some embodiments, the UE is configured to receive reference signals from the BS, measure reference signals and provide feedback information to the BS for use in beam management and/or CSI determination. Beam management may involve one or more of beam tracking, transmit beam and receive beam alignment, beam training, etc.

In some embodiments, the UE, or other terminal devices, receives a sensing request sent by the BS or the network, that may include sensing configuration information. The sensing configuration information may include one or more of a sensing waveform indication, sensing sequence information, an identification of time and frequency resources on which the reference signal from the BS is transmitted and an indication of a feedback channel to be used by the UE to send the feedback to the BS. A sensing waveform indication refers to an indication of a type of signal that is used for performing sensing. A non-exhaustive list of examples of types of signals include orthogonal frequency division multiplexing (OFDM), discrete Fourier transform spread OFDM (DFT-s-OFDM), chirp based signal, affine frequency division multiplexing (AFDM), orthogonal OTFS, chirp based OFDM/DFT-s-OFDM. The sensing waveform indication may include parameters, such as, but not limited to, cyclic prefix (CP) length, symbol length, the number of samples in time, fast Fourier (FFT) size. A sensing sequence is a sequence that has a special mathematical property, such as Constant Amplitude Zero Auto Correlation. A non-exhaustive list of examples of sensing sequences are Zadoff-chu (ZC) sequence, m sequence, and gold sequence. The sensing sequence acts as an identifier that is used to be able to identify the received signal as compared to the transmit signal.

The sensing request transmitted by the BS or network is a request to involve the UE in performing sensing of the environment in proximity to the UE. The UE performing sensing using beamforming may use information from the RF propagation path map generated as a result of the RF sensing step. The RF propagation path map information may be sent to the UE before the beamformed reference signals are transmitted for beam measurement and/or channel measurement. In some embodiments, the sensing request can be sent separately from the beamformed reference signals configuration information. In some embodiments, the sensing request is transmitted as downlink control information (DCI) to activate the UE in performing sensing of the environment in proximity to the UE.

Beamforming for the reference signals may be generated independently from beamforming used for RF sensing. Different sizes of bandwidths can be applied for the signals used for range sensing and angular sensing. Allowing a larger bandwidth may allow higher resolution for sensing. Reference signal based channel measurement may be used to aid in determining if there has been a dynamic channel change, for example when the UE is moving and passes behind an object that obscures a direct line of sight path between the BS and UE. Configuration information that is sent by the BS to the UE, for example in signaling 421 in FIGS. 4A and 4B, may include information about the grid used in the beam measurement and/or channel measurement and a relation between the grid used for RF sensing and the grid used for beam measurement and/or channel measurement. For example, in some embodiments, the relation between the grid used in the RF sensing step and the grid used for the beam measurement and/or channel measurement may be expressed in the form of the grid elements for beam measurement and/or channel measurement being a fractional size of the grid elements used in the RF sensing step. In some embodiments, the relation between the grid used in the RF sensing step and the grid used for the beam measurement and/or channel measurement may be explicitly indicated to be equal in size or the size of the grids may be inferred to be the same size if there is no explicit indication of the relation between the two grid sizes.

In some embodiments, the sensing configuration information sent by the BS to the UE may include configuration information that identifies the type of information the UE should feedback to the BS and how it should be feedback to the BS. For example, feedback information may include a grid element identifier and a type of measurement to be performed and fed back to the BS. In some embodiments, the grid element identifier and the measurement type is the grid element identifier and a reference signal received power (RSRP). Other types of measurement may include signal-to-noise ratio (SNR), received signal strength indicator (RSSI) or Reference Signal Received Quality (RSRQ) based on the received reference signals. In some embodiments, the grid element identifier and the measurement type is the grid element identifier and channel coefficients for coherent beamforming or CSI channel reconstruction. Channel coefficients may be complex numbers, including both amplitude and phase, which can enable coherent beamforming at the transmitter side. Referring back to FIG. 9, the UE may be configured with information that indicates that the UE should feedback the grid element identifier and the RSRP measured on the receive beam that corresponds to the grid elements identifier, such as Grid #1 and the RSRP for receive beam 930, Grid #2 and the RSRP for receive beam 932 and Grid #n and the RSRP for receive beam 934.

In some embodiments, when the configuration information sent to the UE includes a relative AoA, the relative AoA may enable the UE to perform a quick receive beam alignment. The expression "quick" here is in comparison to how beam alignment is performed in New Radio (NR). In NR, the UE does not know a relative angle of different possible transmit beams from the BS, so the UE has to search for the transmit beam using multiple receive beams at the UE one at a time for each possible transmit beam. However, in some embodiments of the present disclosure, because the UE is provided information about the relative angle of different transmit beams from the BS, after the UE aligns one received beam with the transmit beam, then UE can align other receive beams of the UE to other transmit beams of the BS.

In some embodiments, the configuration information may reduce overhead of reference signal transmission during the beam measurement and/or channel measurement. This may occur because the UE can use receive beams that are localized to directions identified in the configuration information such as the relative AoAs and can avoid scanning in directions where there is likely to be no reference signals to be received.

Figure 10:
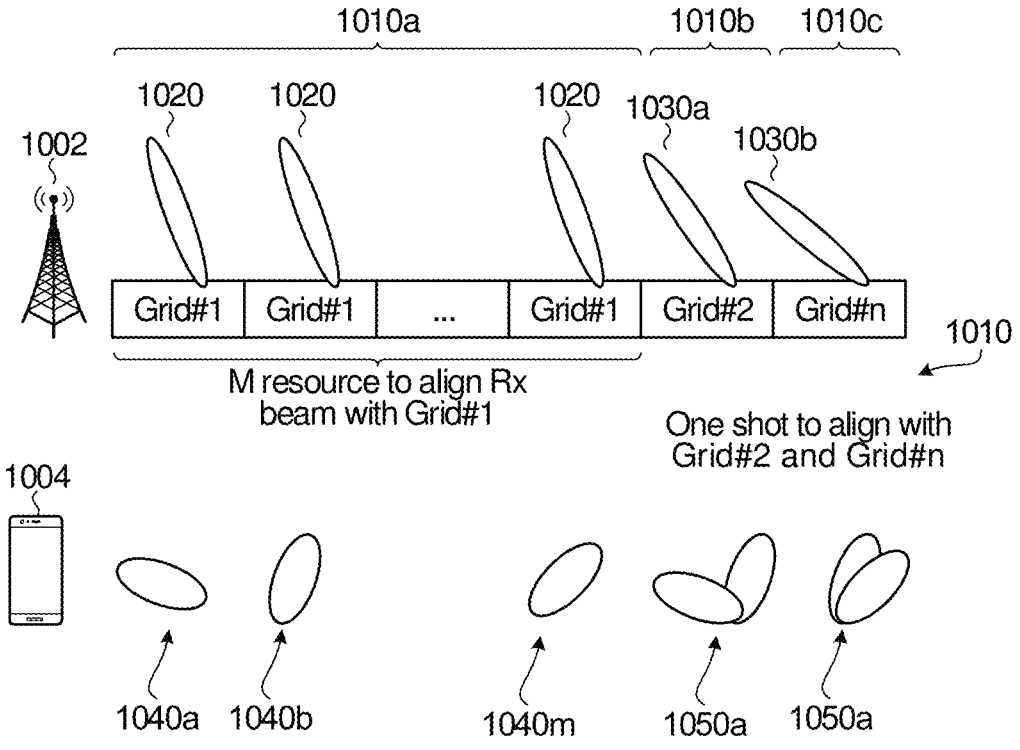
FIG. 10 is an example how transmission resources are allocated for propagation paths for beam measurement and/ or channel measurement according to an aspect of the present disclosure.

In some embodiments, the number of transmission resources configured for transmission can be different for different grid elements as a part of beam measurement and/or channel measurement. FIG. 10, for example, illustrates how more transmission resources are used for transmission of a reference signal to grid element #1 than transmission resources used for transmission of a reference signal to grid element #2 and grid element #n. A transmission resource may be a frequency-time resource used for transmission of the reference signal. FIG. 10 illustrates a set of transmission resources 1010 used for transmission of reference signals from the BS 1002 to a UE 1004. In FIG. 10, above the set of transmission resources 1010 are representations of transmit beams 1020, 1030a and 1030b used during the set of transmission resources 1010 by BS 1002. In a subset of m transmission resources 1010a of the set of transmission resources 1010, each of the m transmission resources are used to transmit a reference signal in a first direction on a first transmit beam 1020. A single transmission resource 1010b of the set of transmission resources 1010 is used to transmit a reference signal in a second direction on a second transmit beam 1030a. A single transmission resource 1010c of the set of transmission resources 1010 is used to transmit a reference signal in a third direction on a third transmit beam 1030b. Below the set of transmission resources 1010 are representations of receive beams 1040a, 1040b, 1040m, 1050a and 1050b used during the set of transmission resources 1010 by the UE 1004. It can be seen that in the first subset of transmission resources 1030a, receive beams 1040a, 1040b and 1040m of different directions are used for each separate transmission resource in the first subset of transmission resources 1010a. It can also be seen that during the transmission resource 1010b and the transmission resource 1010c, multiple receive beams may be used to receive during those transmission resources. The multiple transmission resources in the subset of transmission resources 1010a may be used for aligning the receive beams 1040a, 1040b and 1040m at the UE 1004 for monitoring a reference signal transmitted in the direction of grid element #1. Then the UE 1004 can switch to receive beams 1050a in transmission resource 1010b to receive the reference signal transmitted in the direction of grid element #2 and subsequent to that, the UE 1004 can switch to receive beams in transmission resource 1010c to receive the reference signal transmitted in the direction of grid element #n. Such a method may reduce the time and/or frequency overhead and the latency for grid elements #2, . . . #n.

When considering the channel that is part of the RF environment sensing and the channel that may be a potential communication channel as a part of beam measurement and/or channel measurement, there are associations between the channels. There may be considerably more channels that are determined as a part of the RF environment sensing in the RF sensing step than are determined as potential communication channels during beam measurement and/or channel measurement.

In some embodiments, the sensing channel may be represented as:

$$H_s = \sum_{l=0}^{L} h_l^s \exp(j2\pi\tau_l) a(M, \theta_l) a^T(M, \theta_l) =$$

$$\sum_{l=0}^{L_{Ant}} h_l^s \exp(j2\pi\tau_l) a(M, \theta_l) a^T(M, \theta_l) +$$

$$\sum_{l=L_{Ant}+1}^{L} h_l^s \exp(j2\pi\tau_l) a(M, \theta_l) a^T(M, \theta_l).$$

$H_s$ denotes the channel matrix determined by receiving and measuring the sensing signal that is reflected off of an object, which involves L paths, and $L_{Ant}$_paths are antenna paths at the UE antenna, $h_l^s$ are sensing channel coefficients of an l-th path, $\tau_l$ is a delay of an l-th path, $\theta_l$ is an angle of departure of an l-th path, which can be expressed in azimuth or zenith angle directions, M is a number of antenna elements of the transmitter or the receiver, $\alpha(M, \theta_l)$ is a steering vector of the transmitter or the receiver antenna and $a^T(M, \theta_l)$ is a transposed version of $a(M, \theta_l)$.

In some embodiments, the potential communication channel may be represented as:

$$H_c = \sum_{l=0}^{L_{Ant}} h_l^c \exp(j2\pi\tau_l) a_{gNB}^T(M, \theta_l^{gNB}) a_{UE}^T(N, \theta_l^{UE}).$$

$H_c$ denotes the channel matrix determined by receiving and measuring the sensing signal that is reflected off of an object, which involves L paths, wherein $L_{Ant}$ paths are antenna paths from a UE antenna, $h_l^c$ are communication channel coefficients of an l-th path, T is a delay of an l-th path, $\theta_l$ is an angle of departure of an l-th path, which can be expressed in azimuth or zenith angle directions, M is a number of antenna elements of the transmitter or the receiver, $a\_a_{gNB}(M, \theta_l)$ is the steering vector of the transmitter (gNB) antenna $a\_a^T{}_{UE}$ (M, $\theta_l$) is a transposed version of steering vector of the UE antenna.

With regard to the above two expressions, the path(s) in a potential communication channel is a subset of the paths in the sensing channel.

In some embodiments, the sensing channel may be represented as:

$$H_s = \sum_{l=0}^{L} h_l^s \exp(j2\pi\tau_l) a(M, \theta_l) a^T(M, \theta_l)$$

In some embodiments, the communication channel may be represented as:

$$H_c = \sum_{l=0}^{L} h_l^c \exp(j2\pi\tau_l) a_{gNB}^T(M, \theta_l) a_{UE}^T(N, \theta_l^{UE})$$

With regard to the above two expression, the paths in sensing channel are same as that in communication channel.

In some embodiments, the sensing channel may be represented as:

$$H_s = \sum_{l=0}^{L} h_l^s \exp(j2\pi\tau_l) a_{gNB}(M, \theta_l^{Tx}) a_{gNB}^T(M, \theta_l^{Rx})$$

$$\theta_l^{Tx} \neq \theta_l^{Rx}$$

When the BS transmits sensing signals for RF environment sensing, the transmit beams at the BS may be different than the receive beams.

Figure 11:
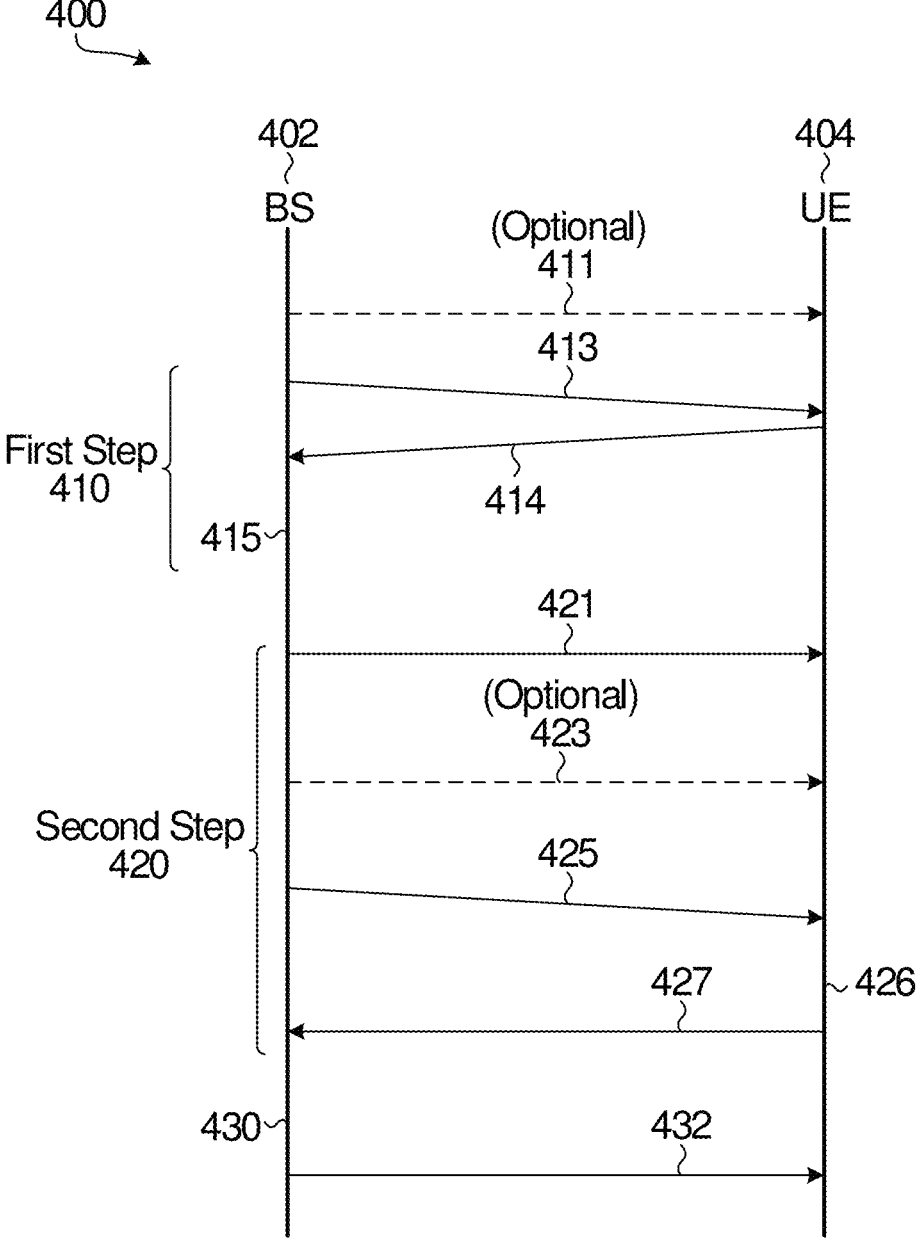
FIG. 11 a more detailed example of a signaling flow diagram for a two-step method of sensing and beam measurement/channel measurement according to aspects of the present disclosure.

FIG. 11 includes a signaling flow diagram similar to FIGS. 4A and/or 4B, but with some additional steps that includes RF sensing performed by the BS 402 and signaling of configuration information being transmitted from the BS 402 to the UE 404. The steps that are the same as in FIGS.

4A and/or 4B. have maintained the same numbering as in FIGS. 4A and/or 4B. The signaling method described below, while being multiple communications between a transmitter and a receiver is generally being referred to as a "two-step" process as there two main functional aspects of the overall method. However, these two functional steps may each contain multiple signaling actions and it is to be understood that the "two steps" are not simply two individual actions.

In a first step of the two step method, generally indicated at 410, information is obtained about the environment by the BS 402 performing RF environment sensing. The RF environment sensing includes the BS 402 transmitting 413 a reference signal in multiple directions and receiving 414 a reflected version of each of the reference signals. For example, the reference signal may reflect off of the UE 404, as shown, and off of other objects in the environment (not shown). The BS 402 may partition some or all of the environment into a two dimensional (2D) or three dimensional (3D) grid. The grid may be referred to as a first grid so as to distinguish the first grid from a grid that is used in the second step. As a further action in the first step 410, the BS 402 may develop 415 an RF propagation path map based on the RF environment sensing information received at the BS 402. Based the RP propagation map, the BS 402 may select a general direction of the UE, i.e. a particular portion of the first grid, for further detailed environment sensing to further define the RF propagation path map.

The physical space, and the eventual generated RF propagation path map, may refer to a whole geographical area or only a portion of a geographical area served by a single transmitter or by multiple transmitters. The BS 402 performs RF environment sensing and this allows the BS 402 to obtain a quick and somewhat coarse channel propagation information based on reflection of transmitted reference signals. Based on the quick and coarse channel propagation information, the BS 402, or the network the BS 402 is in communication with, is able to select a subset of grid elements in the first grid that are determined to be in the direction of the UE 404. The subset of grid elements in the first grid correspond to a set of propagation paths that may be used by the BS 402 to send reference signals to the UE 404 in the second step, generally indicated at 420, to be measured by the UE 404. Once the reference signals have been measured, the UE 404 can send feedback information to the BS 402 that the BS 402 can used to further improve the RF propagation path map and/or determine transmit receive beam pair for a downlink channel between the BS 402 and UE 404. In some embodiments, the BS 402 subdivides the first grid elements into smaller grid elements that can be used for possible propagation paths for transmitting reference signals in the second step 420. These smaller grid elements may collectively be referred to as the second grid. The smaller elements in the second grid may be used to obtain information pertaining to beam measurement or channel measurement in the second step 420. In some embodiments, The BS 402 does not partition the first grid elements in the first grid into smaller grid elements, but maintains the size of the grid elements from the first grid that can be used for transmitting reference signals in the second step 420. Therefore, it may be possible to obtain beam measurements and channel measurements with respect to grid elements that are the same size of the first grid elements or that are smaller than the first grid elements in the second step 420. The first step 410 may be appropriate for channel state information, such as path loss or penetration loss of channel, longer time scale channel status and/or information acquisition that occurs over a large scale. Large scale may refer channel state information over a long duration or over a large geographical area. Large scale may refer channel state information, such as average signal-power attenuation or path loss, average delay and delay spread in time domain, average Doppler and Doppler spread, average AoA/AOD and angle spread.

In some embodiments, the RF environment sensing may be performed by other network devices in addition to the BS 402. The other network devices may perform the RF environment sensing and provide the information to the network or to the BS 402, and the information can be used by the network or BS 402 for generating the RF propagation path map.

In some embodiments, a sensing agent may perform sensing using non-cellular radio frequency techniques such radar, a camera, or GPS. In some embodiments, information that may be obtained by sensing is added to data stored at the BS or network and could be useful in generating the RF propagation map.

As a part of the first step 410, the BS 402 may optionally send 411 configuration information to the UE 404 that identifies first grid information, i.e. information about how the physical space is partitioned into the first grid. The configuration information pertaining to the grid elements of the grid in the first step may identify how the physical space is divided into grid elements, for example how big the respective grid elements are. The configuration information may also indicate how RF beams transmitted by the BS map to the respective grid elements. The configuration information may include a number of grids in both azimuth and zenith directions, or either the azimuth direction or in the zenith direction.

In some embodiments, the configuration information transmitted in step 411 is transmitted by radio resource control signaling (RRC).

At the end of the first step 410, or early in the second step 420, the BS may transmit 421 additional configuration information to the UE 404.

The configuration information transmitted at step 421 may pertain to a relationship between the grid used in the first step and the grid used in the second step, for example the relationship between the size of the grid elements in the first grid and the second grid and the size of the grid in the second grid can be equal to or smaller than that in the first grid.

After the BS 402 or network has generated the RF propagation map and has chosen particular propagation paths between the BS 402 and the UE 404, the configuration information transmitted at step 421 may include identifiers for the grid elements in the grid used during the second step for which the BS is transmitting reference signals in the direction thereof. In some embodiments, the configuration information pertaining to the first grid is transmitted on a broadcast channel to one or more UEs or on a unicast channel to a particular UE. The configuration information may be transmitted by radio resource control (RRC) signaling after the UE 404 has completed initial access (IA) to the network and has established a radio connection with the network in a CONNECTED state.

In some embodiments, at step 421, the configuration signaling transmitted by BS 402 the BS 402 may include a request to activate the UE 404 to take part in a beam measurement and/or a channel measurement to further improve the RF propagation map. In some embodiments this request may be transmitted using RRC signaling or other types of DL channel signals, such as DCI or media access control-control element (MAC-CE) on downlink control information (DCI).

In some embodiments, at step 421, the configuration signaling transmitted by BS 402 may indicate an angular difference value between various AoAs for beams arriving at the UE 404, i.e. the angle differential between propagation paths, to assist in channel measurement and/or receiver beam training.

In some embodiments, at step 421, the configuration signaling transmitted by BS 402 may include a relative delay between reference signals that may be received at the UE from different directions, as well as AoDs from the BS, for each candidate propagation path, which may be used by the UE to assist in performing channel measurements.

In some embodiments, the configuration information sent by the BS 402 to the UE 404 in step 421 may include configuration information that identifies the type of information the UE 404 should feedback to the BS 402 and how it should be feedback to the BS.

In some embodiments, the configuration information transmitted in step 421 is transmitted by RRC. In some embodiments, some or all of the configuration information transmitted in step 421 is transmitted by MAC-CE.

While the various configuration signaling described above are all described as occurring at step 421, it should be understood that the various configuration signaling may be sent together, or may be sent separately around the same time.

The BS 402 may optionally transmit 423 a request to the UE 404 to activate the UE 404 to take part in a beam measurement and/or a channel measurement to further improve the RF propagation map. The reference signals are transmitted 425 by the base station 402 using propagation paths in a direction of the grid elements that were determined by the BS 402. As described, the grid elements of the second grid may be the same size as the grid elements or small than the grid elements. Such an activated, or "on-demand", based beam measurement and/or channel measurement may provide a more accurate channel acquisition and/or improve the detail of the RF propagation path map. The beam measurement and/or channel measurement may result in higher resolution and accuracy in the RF propagation path map.

In some embodiments, the feedback information such as beam management (BM) information and/or CSI-RS information is transmitted 427 to enable the BS 402 to update the RF propagation map generated in the first step 410 and perform beam acquisition with the UE 404. The feedback information transmitted by the UE 404 at step 427 may be transmitted as uplink control information (UCI) on a physical uplink control channel (PUCCH) or a physical uplink shared channel (PUSCH).

After the BS 402 receives the feedback signal, the BS may update 430 the RF propagation path map based on the feedback information.

At some subsequent point in time based on a most recently updated version of the RF propagation path map, the BS may select 430 one or more beams for data transmission to the UE 404 on a downlink channel on one or more beams that have been selected based on the RF propagation path map. In some embodiments, the downlink channel may be a physical downlink shared channel (PDSCH) or a physical downlink control channel (PDCCH) or another physical channel. The BS 402 may then transmit 432 the data transmission to the UE 404.

Embodiments described herein consider beam acquisition between a BS and target UE for downlink communication. However, it should be understood that the described method according to an embodiment (for example as described with regard to FIG. 11) could be applied to uplink and/or side-link communication as well.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method applied in a base station side, the method comprising:
   transmitting configuration information comprising an association of a location of a user equipment (UE) in a geographical area and channel information pertaining to a channel between a base station serving the geographical area and the UE, wherein at least a portion of the geographical area is partitioned into a first grid comprising a plurality of first grid elements;
   transmitting reference signals in a direction of the location of the UE on one or more propagation paths, wherein the location of the UE is within a second grid of the geographical area, the second grid comprising a plurality of second grid elements; and
   receiving feedback information based on measurement of the reference signals.

2. The method of claim 1, wherein the channel information is information to aid in performing a channel measurement at the UE.

3. The method of claim 1, wherein the channel information comprises at least one of:
   a location of a virtual transmission point (VTP) that appears to be transmitting the reference signals;
   a relative delay between propagation paths transmitted at two different first grid elements;
   a relative power value between propagation paths transmitted at two different first grid elements; or
   an angle of arrival (AoA) of a beam received at the UE.

4. The method of claim 1, further comprising:

transmitting a request for radio frequency (RF) sensing to be performed by the UE, wherein the RF sensing is performed with reference to the plurality of second grid elements.

5. The method of claim 4, wherein the request for the RF sensing to be performed by the UE further comprises sensing configuration information for the UE.

6. The method of claim 5, wherein the sensing configuration information comprises one or more of:

a sensing waveform indication;

sensing sequence information;

time or frequency resource information for the reference signals;

an indication of the feedback information that the UE should transmit to the base station; or a feedback reporting channel indication.

7. The method of claim 1, wherein the configuration information further comprises identification of propagation paths from the base station to one or more first grid elements in the first grid.

8. The method of claim 1, further comprising:

determining a map of objects in the geographical area to determine propagation paths between the base station and the UE.

9. The method of claim 8, wherein the determining the map of objects comprises:

performing ray tracing of the propagation paths between the base station and the UE to determine whether detected objects are real objects or are reflections of real objects.

10. The method of claim 8, further comprising:

transmitting a data signal to the UE on one or more beams having the propagation paths between the base station and the UE determined based on the map of objects.

11. The method of claim 1, wherein the receiving the feedback information based on the reference signals includes receiving at least one of:

a grid element identifier of a grid element of the second grid and a reference signal received power (RSRP) value; or a grid element identifier of a grid element of the second grid and channel state information.

12. The method of claim 1, wherein the plurality of second grid elements results from partitioning of the plurality of first grid elements.

13. A method applied in a user equipment (UE) side, the method comprising:

receiving configuration information comprising an association of a location of a UE in a geographical area and channel information pertaining to a channel between a base station serving the geographical area and the UE, wherein at least a portion of the geographical area is partitioned into a first grid comprising a plurality of first grid elements;

receiving reference signals on one or more propagation paths, wherein the location of the UE is within a second grid of the geographical area, the second grid comprising a plurality of second grid elements;

performing measurement of the reference signals; and transmitting feedback information based on the measurement of the reference signals.

14. The method of claim 13, wherein the channel information is information to aid in performing channel measurement at the UE.

15. The method of claim 13, wherein the channel information comprises at least one of:

a location of a virtual transmission point (VTP) that appears to be transmitting the reference signals;

a relative delay between propagation paths transmitted at two different first grid elements;

a relative power value between propagation paths transmitted at two different first grid elements; or an angle of arrival (AoA) of a beam received at the UE.

16. The method of claim 13, further comprising:

receiving a request for radio frequency (RF) sensing to be performed by the UE, wherein the RF sensing is performed with reference to the plurality of second grid elements.

17. The method of claim 16, wherein the request for the RF sensing to be performed by the UE further comprises sensing configuration information for the UE.

18. The method of claim 17, wherein the sensing configuration information comprises one or more of:

a sensing waveform indication;

sensing sequence information;

time or frequency resource information for the reference signals;

an indication of the feedback information that the UE should transmit to the base station; or a feedback reporting channel indication.

19. The method of claim 13, wherein the configuration information further comprises identification of propagation paths from the base station to one or more first grid elements in the first grid.

20. The method of claim 13, wherein the transmitting the feedback information based on the reference signals includes transmitting at least one of:

a grid element identifier of a grid element of the second grid and a reference signal strength value; or a grid element identifier of a grid element of the second grid and channel state information.

21. The method of claim 13, further comprising:

receiving a data signal on one or more beams having propagation paths determined based at least in part on the feedback information.

22. The method of claim 13, wherein the plurality of second grid elements results from partitioning of the plurality of first grid elements.

23. An apparatus comprising:

at least one processor; and a computer readable medium, having stored thereon, computer executable instructions that, when executed by the at least one processor, cause the apparatus to perform operations including:

transmitting configuration information comprising an association of a location of a user equipment (UE) in a geographical area and channel information pertaining to a channel between a base station serving the geographical area and the UE, wherein at least a portion of the geographical area is partitioned into a first grid comprising a plurality of first grid elements;

transmitting reference signals in a direction of the location of the UE on one or more propagation paths, wherein the location of the UE is within a second grid of the geographical area, the second grid comprising a plurality of second grid elements; and receiving feedback information based on measurement of the reference signals.

24. The apparatus of claim 23, wherein the channel information is information to aid in performing a channel measurement at the UE.

25. The apparatus of claim 23, wherein the channel information comprises at least one of:

a location of a virtual transmission point (VTP) that appears to be transmitting the reference signals;

a relative delay between propagation paths transmitted at two different first grid elements;

a relative power value between propagation paths transmitted at two different first grid elements; or an angle of arrival (AoA) of a beam received at the UE.

26. The apparatus of claim 23, wherein the apparatus is or is included in the base station.

27. The apparatus of claim 26, wherein the apparatus is or is included in the UE.

28. An apparatus comprising:

at least one processor; and a computer readable medium, having stored thereon, computer executable instructions that, when executed by the at least one processor, cause the apparatus to perform operations including:

receiving configuration information comprising an association of a location of a user equipment (UE) in a geographical area and channel information pertaining to a channel between a base station in the geographical area and the UE, wherein at least a portion of the geographical area is partitioned into a first grid comprising a plurality of first grid elements;

receiving reference signals from the base station on one or more propagation paths, wherein the location of the UE is within a second grid of the geographical area, the second grid comprising a plurality of second grid elements;

performing measurement of the reference signals; and transmitting feedback information based on the measurement of the reference signals.

29. The apparatus of claim 28, the operations further comprising:

receiving a request for radio frequency (RF) sensing to be performed by the UE, wherein the RF sensing is performed with reference to the plurality of second grid elements.

30. The apparatus of claim 29, wherein the request for the RF sensing to be performed by the UE further comprises sensing configuration information for the UE.

31. The apparatus of claim 30, wherein the sensing configuration information comprises one or more of:

a sensing waveform indication;

sensing sequence information;

time or frequency resource information for the reference signals;

an indication of the feedback information that the UE should transmit to the base station; or a feedback reporting channel indication.

32. The apparatus of claim 28, wherein the configuration information further comprises identification of propagation paths from the base station to one or more first grid elements in the first grid.

* * * * *